United States Patent
Oyabu et al.

(10) Patent No.: US 8,760,536 B2
(45) Date of Patent: Jun. 24, 2014

(54) CAMERA DEVICE, COLOR CALIBRATION METHOD, AND PROGRAM

(75) Inventors: Satoru Oyabu, Kanagawa (JP); Yasuji Nakamura, Fukuoka (JP); Yuma Kobayashi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 284 days.

(21) Appl. No.: 13/321,994

(22) PCT Filed: Apr. 28, 2010

(86) PCT No.: PCT/JP2010/003040
§ 371 (c)(1),
(2), (4) Date: Jan. 23, 2012

(87) PCT Pub. No.: WO2010/137236
PCT Pub. Date: Dec. 2, 2010

(65) Prior Publication Data
US 2012/0113294 A1      May 10, 2012

(30) Foreign Application Priority Data
May 25, 2009   (JP) .................................. 2009-124904

(51) Int. Cl.
*H04N 9/73* (2006.01)
*H04N 17/00* (2006.01)
*H04N 1/46* (2006.01)

(52) U.S. Cl.
USPC ......... 348/223.1; 348/187; 348/655; 358/516

(58) Field of Classification Search
USPC ................ 348/223.1, 224.1, 225.1, 655, 187; 358/516
See application file for complete search history.

(56) References Cited

U.S. PATENT DOCUMENTS

| 7,365,778 B2 * | 4/2008 | Takeshita .................... 348/223.1 |
| 7,755,671 B2 * | 7/2010 | Wang et al. ................. 348/223.1 |
| 7,969,479 B2 * | 6/2011 | Noh et al. ................... 348/223.1 |

(Continued)

FOREIGN PATENT DOCUMENTS

| JP | 6-70327 | 3/1994 |
| JP | 2002159018 A * | 5/2002 |

(Continued)

OTHER PUBLICATIONS

Translation of JP 2009-050022 A; Oct. 31, 2013.*
International Preliminary Report on Patentability for PCT/JP2010/003040, dated Dec. 22, 2011 (translation of Form PCT/ISA/237).

*Primary Examiner* — John Villecco
(74) *Attorney, Agent, or Firm* — Greenblum & Bernstein, P.L.C.

(57) ABSTRACT

A camera device (1) includes: an imaging unit (2) having a complementary color filter; a color temperature estimating unit (8) that estimates a color temperature on the basis of a video signal obtained from the imaging unit (2); a color parameter calculating unit (9) that calculates a color parameter value corresponding to the estimated color temperature; and a color calibrating unit (7) that performs color calibration using the calculated color parameter value. The color parameter calculating unit (9) calculates the color parameter value corresponding to the estimated color temperature on the basis of color parameter values (a first color parameter value and a second color parameter value) at two reference color temperatures (a first color temperature 2000 K and a second color temperature 3200 K). This allows performing color calibration with high color reproducibility using suitable color parameter values according to a change in an illumination condition as well as allows substantially reducing an amount of data required to determine the suitable color parameter values.

4 Claims, 5 Drawing Sheets

(56) References Cited

U.S. PATENT DOCUMENTS

| | | | |
|---|---|---|---|
| 8,331,660 B2 * | 12/2012 | Suen et al. | 348/223.1 |
| 2005/0179789 A1 * | 8/2005 | Horie | 348/223.1 |
| 2006/0012688 A1 * | 1/2006 | Kim | 348/223.1 |
| 2007/0085911 A1 | 4/2007 | Nakamura | |
| 2008/0259186 A1 * | 10/2008 | Wang et al. | 348/238 |
| 2008/0303918 A1 * | 12/2008 | Keithley | 348/223.1 |
| 2012/0050567 A1 * | 3/2012 | Cote et al. | 348/224.1 |
| 2013/0251259 A1 * | 9/2013 | Sakai et al. | 382/167 |

FOREIGN PATENT DOCUMENTS

| | | | |
|---|---|---|---|
| JP | 2005-323144 | | 11/2005 |
| JP | 2007-110576 | | 4/2007 |
| JP | 2008-104046 | | 5/2008 |
| JP | 2009-50022 | | 3/2009 |
| JP | 2009188948 A | * | 8/2009 |
| JP | 2011211327 A | * | 10/2011 |
| JP | 2012019293 A | * | 1/2012 |

\* cited by examiner

CAMERA DEVICE, COLOR CALIBRATION METHOD, AND PROGRAM

TECHNICAL FIELD

The present invention relates to a color calibration technique employed by camera devices.

BACKGROUND ART

Conventionally, a camera device such as a surveillance camera has used a complementary color CCD (an image pickup device having a complementary color filter) in order to increase the sensitivity of the camera. In such a conventional camera device, color parameters are set according to the spectral sensitivities of the complementary color CCD, and color calibration (calibration) is performed using the color parameters (e.g., see Patent Literature 1). The values of the color parameters are usually set according to illumination conditions of so-called standard light sources (e.g., a color temperature 3200 K).

However, in the conventional camera devices, because color parameter values are set according to illumination conditions of standard light sources (e.g., a halogen light of a color temperature 3200 K), if an illumination condition is changed, a color phase shift occurs and suitable color calibration is not performed. For example, if a color temperature of a light source is extremely low (especially, under an illumination condition close to a near-infrared light such as illumination in tunnels), although an actual color is whitish, suitable color calibration is not performed, resulting in an orangish color.

Thus, it is contemplated to calibrate a difference of a color parameter by using a technique that specifies any color parameter value in a three-dimensional color space (a color space of luminance in one dimension and chrominance in two dimensions). However, there are innumerable color parameters based on primary colors and complementary colors (e.g., three primary colors of "R," "G," and "B" and three complementary colors of "Cy," "Mg," and "Ye") as well as a calibration amount for a color parameter is different for each color temperature. Therefore, since a data amount of a table storing calibration amounts for all color parameters for each color temperature would be enormous, it is difficult to say that this table is practical.

CITATION LIST

Patent Literature

Patent Literature 1: Japanese Patent Laid-Open No. 2008-104046

SUMMARY OF INVENTION

Technical Problem

The present invention has been made in view of such circumstances. An object of the present invention is to provide a camera device that can perform color calibration with high color reproducibility using suitable color parameter values according to a change in an illumination condition as well as can substantially reduce an amount of data required to determine the suitable color parameter values.

Solution to Problem

An aspect of the present invention is a camera device. The camera device includes: an imaging unit; a color temperature estimating unit that estimates a color temperature on the basis of a video signal obtained from the imaging unit; a color parameter calculating unit that calculates a color parameter value corresponding to the estimated color temperature on the basis of a first color parameter value and a second color parameter value being color parameter values at a first color temperature and a second color temperature being two reference color temperatures; and a color calibrating unit that performs color calibration using the calculated color parameter value.

Another aspect of the present invention is a color calibrating method. The color calibrating method is used in a camera device including an imaging unit and includes: estimating a color temperature on the basis of a video signal obtained from the imaging unit; calculating a color parameter value corresponding to the estimated color temperature on the basis of a first color parameter value and a second color parameter value being color parameter values at a first color temperature and a second color temperature being two reference color temperatures; and performing color calibration using the calculated color parameter value.

Yet another aspect of the present invention is a program for color calibration performed by a camera device. The program causes a computer to execute: processing for estimating a color temperature on the basis of a video signal obtained from an imaging unit of the camera device; processing for calculating a color parameter value corresponding to the estimated color temperature on the basis of a first color parameter value and a second color parameter value being color parameter values at a first color temperature and a second color temperature being two reference color temperatures; and processing for performing color calibration using the calculated color parameter value.

As described later, there are other aspects of the present invention. Therefore, the disclosure of this invention is intended to provide some aspects of the present invention, and is not intended to limit the scope of the invention described herein and claimed.

DESCRIPTION OF EMBODIMENT

Figure 1:
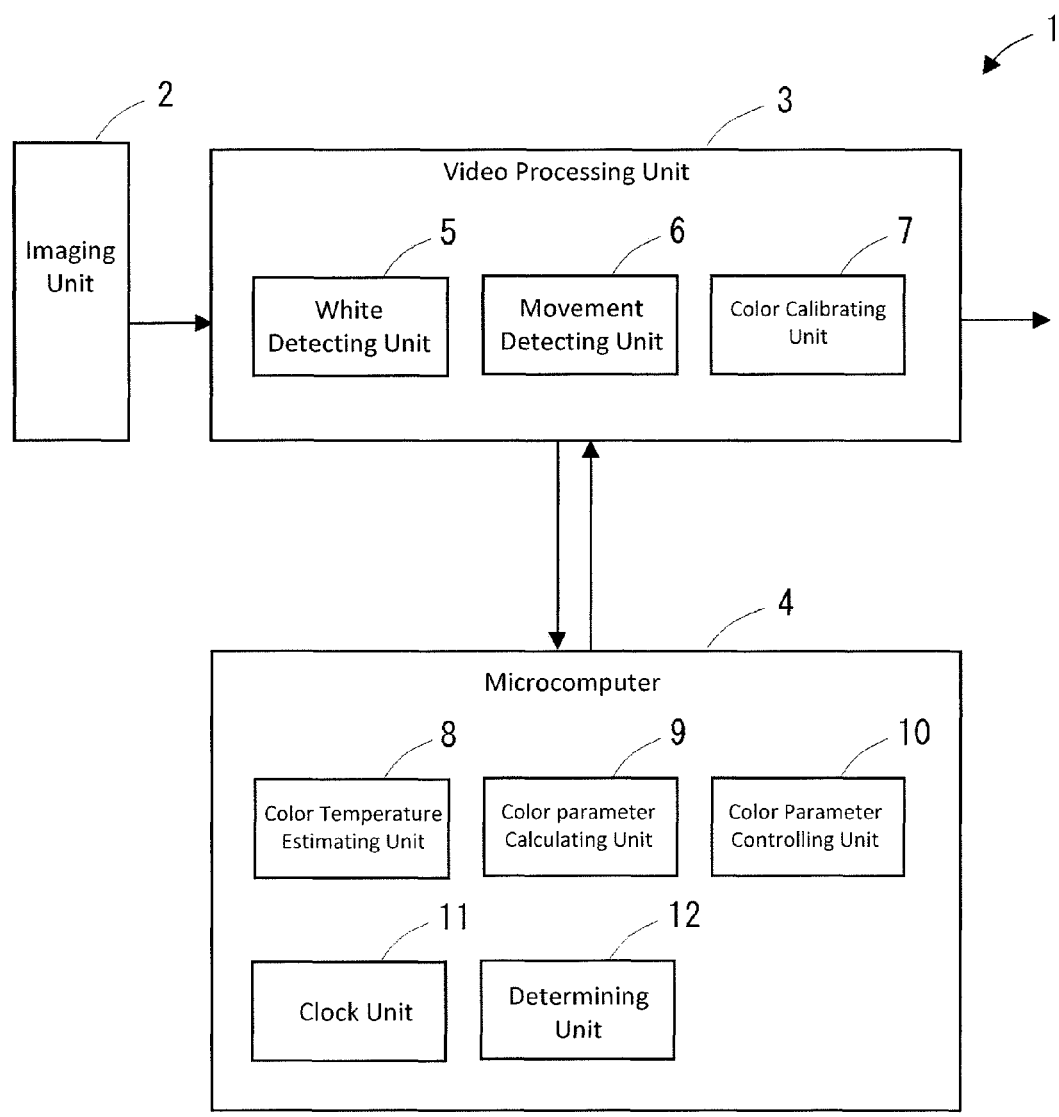
FIG. 1 is a block diagram illustrating a configuration of a camera device according to an embodiment of the present invention.

Detailed description of the present invention will be made below. However, the following detailed description and the accompanying drawings do not limit the invention.

A camera device of the present invention has a configuration including: an imaging unit; a color temperature estimating unit that estimates a color temperature on the basis of a video signal obtained from the imaging unit; a color parameter calculating unit that calculates a color parameter value corresponding to the estimated color temperature on the basis of a first color parameter value and a second color parameter value being color parameter values at a first color temperature and a second color temperature being two reference color temperatures; and a color calibrating unit that performs color calibration using the calculated color parameter value.

This configuration allows calculating a color parameter value corresponding to a color temperature estimated from a video signal with only data of color parameter values (a first color parameter value and a second color parameter value) at two reference color temperatures (a first color temperature and a second color temperature). An amount of the data of the first color parameter value and the second color parameter value is much smaller than an amount of data required for conventional color parameter calibration. This allows performing color calibration with high color reproducibility using suitable color parameter values according to a change in an illumination condition as well as allows substantially reducing an amount of data required to determine the suitable color parameter values.

Further, the camera device of the present invention may have a configuration including a color parameter controlling unit that gradually changes a color parameter value used for the color calibration from a color parameter value corresponding to a standard color temperature to the calculated color parameter value.

According to the configuration, when color calibration is performed using the color parameter value calculated in accordance with a change in an illumination condition, a color parameter value is controlled so as to be gradually changed from a color parameter value corresponding to a standard color temperature. This prevents sharp color calibration from occurring when an illumination condition is changed, and color calibration (color calibration using suitable color parameter values) is performed naturally and gradually.

Further, the camera device of the present invention may have a configuration including: a movement detecting unit that detects a moving object in an image captured by the imaging unit; and a second color parameter controlling unit that suppresses, when the moving object is detected, changing from a color parameter value corresponding to a standard color temperature to the calculated color parameter value.

According to the configuration, if a captured image includes a moving object, a color temperature may be erroneously estimated, but in such a case, a color parameter value is controlled so that color calibration is performed using a color parameter value corresponding to a standard color temperature. This allows preventing color calibration using a color parameter value calculated on the basis of an erroneously estimated color temperature (an unsuitable color parameter value).

Further, the camera device of the present invention may have a configuration including a determining unit that determines, on the basis of a degree of relationship between the estimated color temperature and a current time, whether or not the calculated color parameter value is used for the color calibration.

According to the configuration, if a degree of relationship between a color temperature estimated from a video signal and a current time is low, a color temperature may be erroneously estimated, but in such a case, it is determined that the calculated color parameter value is not used for the color calibration (i.e., the color calibration is performed using a color parameter value corresponding to a standard color temperature). This allows preventing color calibration using a color parameter value calculated on the basis of an erroneously estimated color temperature (an unsuitable color parameter value).

A color calibrating method of the present invention is a color calibrating method used in a camera device including an imaging unit and includes: estimating a color temperature on the basis of a video signal obtained from the imaging unit; calculating a color parameter value corresponding to the estimated color temperature on the basis of a first color parameter value and a second color parameter value being color parameter values at a first color temperature and a second color temperature being two reference color temperatures; and performing color calibration using the calculated color parameter value.

As before, the method also allows calculating a color parameter value corresponding to a color temperature estimated from a video signal with only data of color parameter values (a first color parameter value and a second color parameter value) at two reference color temperatures (a first color temperature and a second color temperature). Therefore, color calibration with high color reproducibility can be performed using suitable color parameter values according to a change in an illumination condition as well as an amount of data required to determine the suitable color parameter values can be substantially reduced.

A program of the present invention is a program for color calibration performed by a camera device and causes a computer to execute: processing for estimating a color temperature on the basis of a video signal obtained from an imaging unit of the camera device; processing for calculating a color parameter value corresponding to the estimated color temperature on the basis of a first color parameter value and a second color parameter value being color parameter values at a first color temperature and a second color temperature being two reference color temperatures; and processing for performing color calibration using the calculated color parameter value.

As before, the program also allows calculating a color parameter value corresponding to a color temperature estimated from a video signal with only data of color parameter values (a first color parameter value and a second color parameter value) at two reference color temperatures (a first color temperature and a second color temperature). Therefore, color calibration with high color reproducibility can be performed using suitable color parameter values according to a change in an illumination condition as well as an amount of data required to determine the suitable color parameter values can be substantially reduced.

The present invention includes the color parameter calculating unit that calculates a color parameter value used for color calibration on the basis of color parameter values at two reference color temperatures, thereby allowing performing color calibration with high color reproducibility using suitable color parameter values according to a change in an illumination condition as well as allowing substantially reducing an amount of data required to determine the suitable color parameter values.

Now, the camera device according to the embodiment of the present invention will be described below using the drawings. The present embodiment illustrates a case of a camera device used as a surveillance camera and the like. This camera device includes a color calibration function. This function is implemented by a program stored in memory or the like of the camera device.

The configuration of the camera device according to the embodiment of the present invention will be described with reference to the drawings. FIG. 1 is a block diagram illustrating the configuration of the camera device according to the present embodiment. As illustrated in FIG. 1, the camera device 1 includes an imaging unit 2 including a complementary color CCD (an image pickup device having a complementary color filter), a video processing unit 3 composed of a DSP or the like, and a microcomputer 4 that controls an operation of the video processing unit 3.

The video processing unit 3 includes a white detecting unit 5 that detects a white color area (a white area) included in an image captured by the imaging unit 2, a movement detecting unit 6 that detects a moving object included in an image captured by the imaging unit 2, and a color calibrating unit 7 that performs color calibration using a calculated color parameter value (described later).

On the other hand, the microcomputer 4 includes a color temperature estimating unit 8 that estimates a color temperature on the basis of a video signal of a white area detected by the white detecting unit 5, a color parameter calculating unit 9 that calculates a color parameter value corresponding to the estimated color temperature, and a color parameter controlling unit 10 that controls the color parameter value used for the color calibration.

Furthermore, the microcomputer 4 includes a clock unit 11 that can obtain current time information, and a determining unit 12 that determines, on the basis of a degree of relationship between the estimated color temperature and a current time, whether or not the color parameter value calculated by the color parameter calculating unit 9 is used for color calibration.

The color parameter calculating unit 9 has a function to calculate a color parameter value corresponding to the estimated color temperature on the basis of color parameter values (a first color parameter value and a second color parameter value) at two reference color temperatures (a first color temperature and a second color temperature). The first color temperature is 2000 K, for example. The second color temperature is 3200 K, for example.

Figure 2:
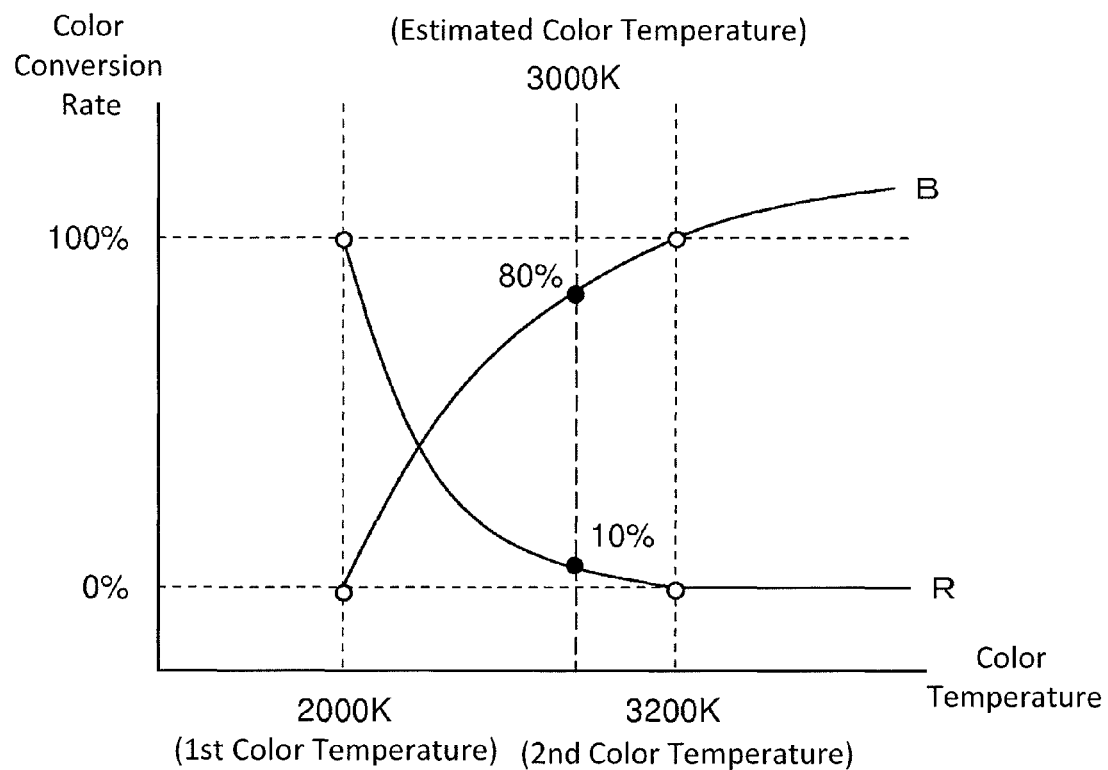
FIG. 2 is a diagram explaining processing in a color parameter calculating unit (processing for calculating a color conversion rate).

Now, the function of the color parameter calculating unit 9 will be described in detail with reference to FIG. 2. FIG. 2 is a diagram explaining processing in the color parameter calculating unit 9 (processing for calculating a color conversion rate). FIG. 2 illustrates the case of calculating color parameter values of "R" and "B" using color conversion rates.

First, processing for calculating a color parameter value of "B" will be described. As illustrated in FIG. 2, the color parameter calculating unit 9 holds color parameter values (shown by white circles) of "B" at premeasured two reference color temperatures (2000 K and 3200 K) as two reference color conversion rates (0% and 100%). The color conversion rate indicates a percentage (%) in which a value to be calculated as a color parameter value corresponding to an estimated color temperature is changed from the value of one color temperature (2000 K) to the value of the other color temperature (3200 K), with color parameter values of "B" at the two color temperatures (2000 K and 3200 K) as a reference.

For example, if the color conversion rate is 0%, a color parameter value of "B" at the color temperature 2000 K is calculated as the color parameter value corresponding to the estimated color temperature. In this case, the value has not been changed at all from the value of the color temperature 2000 K to the value of the color temperature 3200 K (i.e., the color conversion rate is 0%).

On the other hand, if the color conversion rate is 100%, a color parameter value of "B" at the color temperature 3200 K is calculated as the color parameter value corresponding to the estimated color temperature. In this case, the value has been completely changed from the value of the color temperature 2000 K to the value of the color temperature 3200 K (i.e., the color conversion rate is 100%).

The color parameter calculating unit 9 calculates a color parameter value corresponding to an estimated color temperature using such a color conversion rate curve. For example, assume that the estimated color temperature is 3000 K. In this case, as illustrated in FIG. 2, the color conversion rate curve indicates that a color conversion rate of "B" is "80%," and a value obtained by changing the value of the color temperature 2000 K to the value of the color temperature 3200 K by "80%" is calculated as a color parameter value of "B" corresponding to the estimated color temperature (3000 K).

Note that a description will be omitted here, but color parameter values corresponding to an estimated color temperature (e.g., 3000 K) are similarly calculated for other colors such as "R." For example, for "R," as illustrated in FIG. 2, a value obtained by changing the value of the color temperature 3200 K to the value of the color temperature 2000 K by "10%" is calculated as a color parameter value of "R" corresponding to the estimated color temperature (3000 K).

It should be noted that the foregoing has described the example in which with the color parameter values at the two reference color temperatures (2000 K and 3200 K) as a reference, the rates of change (color conversion rates) from the values at one color temperature (2000 K) to the values at the other color temperature (3200 K) are approximated by the "curves," but the scope of the present invention is not limited thereto. For example, the color conversion rates may be approximated by "straight lines." In addition, the two reference color temperatures are not limited to 2000 K and 3200 K.

Next, a function of the color parameter controlling unit 10 will be described. The color parameter controlling unit 10 has a function to gradually (e.g., slowly in five seconds) change a color parameter value used for color calibration from a color parameter value corresponding to a standard color temperature (simply also referred to as the "standard value") to a color parameter value calculated by the color parameter calculating unit 9 (simply also referred to as the "calculated value"). The standard color temperature is 3200 K, for example.

Furthermore, the color parameter controlling unit 10 has a function to, if the movement detecting unit 6 detects a moving object, suppress changing of a color parameter value used for color calibration from a standard value to a calculated value. Therefore, the color parameter controlling unit 10 acts also as the second color parameter controlling unit 10 of the present invention. It should be noted that the processing for suppressing changing from a standard value to a calculated value includes processing for preventing changing from a standard value to a calculated value (allowing no changing) and processing for reducing an amount of change from a standard value to a calculated value (allowing slight changing).

Next, a function of the determining unit 12 will be described. If a degree of relationship between an estimated color temperature and a current time is low, the determining unit 12 determines that the color parameter value calculated by the color parameter calculating unit 9 is not used for the color calibration. For example, if an estimated color temperature is low (e.g., under an illumination condition of an orange color), when a current time is "morning" or "daytime," the determining unit 12 determines that a degree of relationship between the color temperature and the current time is low. If the determining unit 12 determines that a degree of relationship between a color temperature and a current time is low, the color parameter controlling unit 10 suppresses changing of a color parameter value used for the color calibration from the standard value to the calculated value in the same manner as described above.

An operation of the camera device 1 configured as described above will be described with reference to the drawings. Here, the following description will focus on a flow of color calibration processing being a feature of the present invention.

Figure 3:
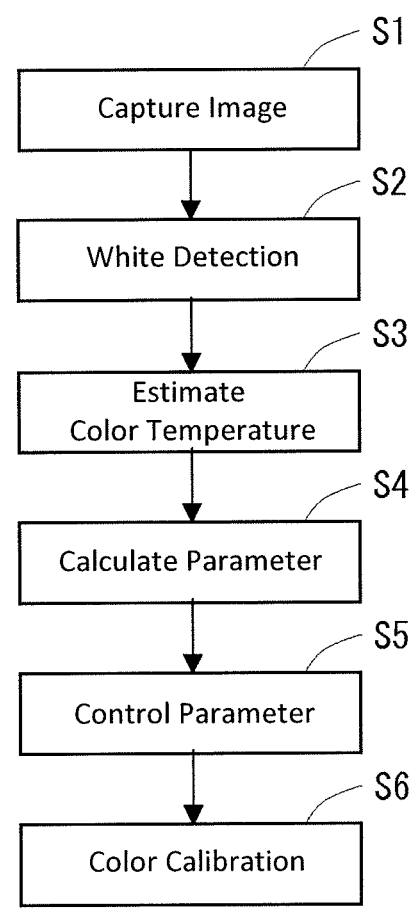
FIG. 3 is a flow diagram illustrating a flow of basic color calibration processing in the embodiment of the present invention.

FIG. 3 is a flow diagram illustrating a flow of basic color calibration processing in the embodiment of the present invention. As illustrated in FIG. 3, in the basic color calibration processing, first, the imaging unit 2 captures an image (S1), then the white detecting unit 5 detects a white area in the image (S2), and the color temperature estimating unit 8 estimates a color temperature from the white area (S3). Then, the color parameter calculating unit 9 calculates a color parameter value from the estimated color temperature using a color conversion rate as described above (S4). The parameter controlling unit gradually changes a color parameter value used for color calibration from a standard value to the calculated value (S5), and the color calibrating unit 7 performs color calibration processing using the color parameter value (S6).

Figure 4:
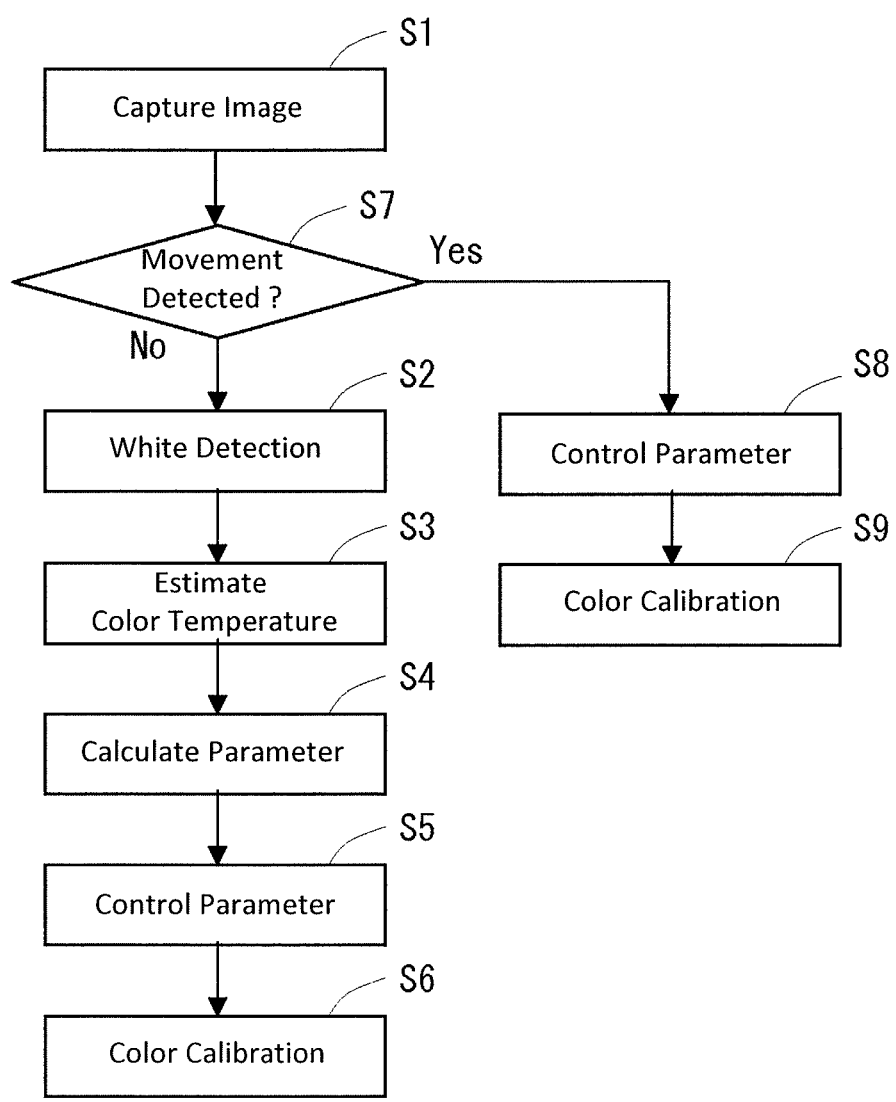
FIG. 4 is a flow diagram illustrating a flow of color calibration processing performed when movement detection is carried out.

FIG. 4 is a flow diagram illustrating a flow of color calibration processing performed when movement detection is carried out. In this case, as illustrated in FIG. 4, first the imaging unit 2 captures an image (S1), and then the movement detecting unit 6 detects whether or not the image includes a moving object (S7). If the moving object is detected in the image, the parameter controlling unit performs controlling to suppress changing of a color parameter value used for color calibration from a standard value to a calculated value (S8), and the color calibrating unit 7 performs color calibration processing using the color parameter value (S9). If any moving object is not detected in the image, the same processing (S2 to S6) as that of the basic color calibration processing is performed.

Figure 5:
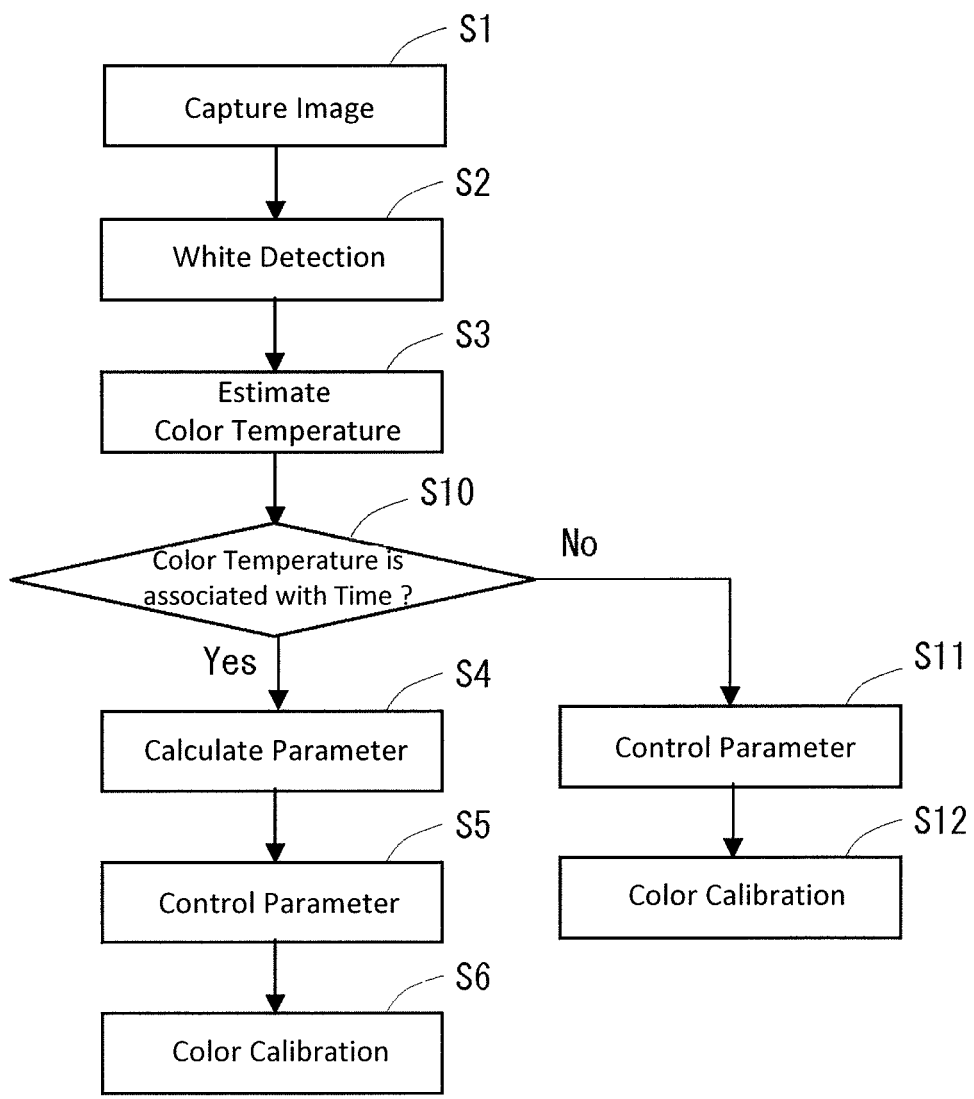
FIG. 5 is a flow diagram illustrating a flow of color calibration processing performed when a degree of relationship between a color temperature and a current time is determined.

FIG. 5 is a flow diagram illustrating a flow of color calibration processing performed when a degree of relationship between a color temperature and a current time is determined. In this case, as illustrated in FIG. 5, like the basic color calibration processing, first the imaging unit 2 captures an image (S1), then the white detecting unit 5 detects a white area in the image (S2), and the color temperature estimating unit 8 performs processing to estimate a color temperature from the white area (S3). Then, the determining unit 12 determines whether or not the estimated color temperature is associated with a current time (whether a degree of relationship is high or not) (S10). If it is determined that the degree of relationship between the color temperature and the current time is low, the parameter controlling unit performs controlling to suppress changing of a color parameter value used for color calibration from a standard value to a calculated value (S11), and the color calibrating unit 7 performs the color calibration processing using the color parameter value (S12). If it is determined that the degree of relationship between the color temperature and the current time is high, the same processing (S4 to S6) as that of the basic color calibration processing is performed.

The camera device 1 according to the embodiment of the present invention includes the color parameter calculating unit 9 that calculates a color parameter value used for color calibration on the basis of color parameter values at two reference color temperatures (2000 K and 3200 K), thereby allowing performing color calibration with high color reproducibility using suitable color parameter values according to a change in an illumination condition as well as allowing substantially reducing an amount of data required to determine the suitable color parameter values.

That is, in the present embodiment, a color parameter value corresponding to a color temperature estimated from a video signal can be calculated with only data of color parameter values (a first color parameter value and a second color parameter value) at two reference color temperatures (a first color temperature 2000 K and a second color temperature 3200 K). An amount of the data of the first color parameter value and the second color parameter value is much smaller than an amount of data required for conventional color parameter calibration. This allows performing color calibration with high color reproducibility using suitable color parameter values according to a change in an illumination condition as well as allows substantially reducing an amount of data required to determine the suitable color parameter values.

Further, in the present embodiment, when color calibration is performed using the color parameter value calculated in accordance with a change in an illumination condition, a color parameter value is controlled so as to be gradually (e.g., slowly in about five seconds) changed from a color parameter value corresponding to a standard color temperature. This prevents sharp color calibration from occurring when an illumination condition is changed, and color calibration (color calibration using suitable color parameter values) is performed naturally and gradually.

Further, in the present embodiment, if a captured image includes a moving object, a color temperature may be erroneously estimated, but in such a case, a color parameter value is controlled so that color calibration is performed using a color parameter value corresponding to a standard color temperature. This allows preventing color calibration using a color parameter value calculated on the basis of an erroneously estimated color temperature (an unsuitable color parameter value).

For example, when a person is passing in front of a whiteboard in video, a white area might be erroneously detected. As a result, a color temperature might be erroneously estimated. Therefore, in such a case, a color parameter value is controlled so that color calibration is performed using a color parameter value corresponding to a standard color temperature. This can improve the accuracy of color temperature estimation.

Further, in the present embodiment, if a degree of relationship between a color temperature estimated from a video signal and a current time is low, a color temperature may be erroneously estimated, but in such a case, it is determined that the calculated color parameter value is not used for the color calibration (i.e., the color calibration is performed using a color parameter value corresponding to a standard color temperature). This allows preventing color calibration using a color parameter value calculated on the basis of an erroneously estimated color temperature (an unsuitable color parameter value).

For example, in the case where an estimated color temperature is "orange," if a current time is "morning" or "daytime," it is determined that a degree of relationship between the color temperature and the current time is low. On the other hand, if the current time is "evening," it is determined that a degree of relationship between the color temperature and the current time is high. This can improve the accuracy of color temperature estimation.

The embodiment of the present invention has been illustrated, but the scope of the present invention is not limited to these examples. The scope of the present invention can be changed and modified within the scope of the claims to attain a particular purpose.

The foregoing has outlined a preferable embodiment of the present invention at the present time, but it will be appreciated that the present embodiment may be variously modified, and the appended claims are intended to include all the modifications within the true spirit and scope of the present invention.

Industrial Applicability

As described above, advantageously, the camera device according to the present invention can perform color calibration with high color reproducibility using suitable color parameter values according to a change in an illumination condition and can substantially reduce an amount of data required to determine the suitable color parameter values; the camera device is used as a surveillance camera and the like, and is useful.

Reference Signs List
1 camera device
2 imaging unit
3 video processing unit
4 microcomputer
5 white detecting unit
6 movement detecting unit
7 color calibrating unit
8 color temperature estimating unit
9 color parameter calculating unit
10 color parameter controlling unit
11 clock unit
12 determining unit

The invention claimed is:

1. A camera device comprising:
an imager;
a color temperature estimator that estimates a color temperature on the basis of a video signal obtained from the imager;
a color parameter calculator that calculates a color parameter value corresponding to the estimated color temperature on the basis of a first color parameter value and a second color parameter value, which are color parameter values at a first reference color temperature and a second reference color temperature;
a color calibrator that performs color calibration using the calculated color parameter value;
a movement detector that detects a moving object in an image captured by the imager; and
a color parameter controller that suppresses, when the moving object is detected, changing of a color parameter value used for the color calibration from a color parameter value corresponding to a standard color temperature to the calculated color parameter value.

2. A camera device comprising:
an imager;
a color temperature estimator that estimates a color temperature on the basis of a video signal obtained from the imager;
a color parameter calculator that calculates a color parameter value corresponding to the estimated color temperature on the basis of a first color parameter value and a second color parameter value, which are color parameter values at a first reference color temperature and a second reference color temperature;
a color calibrator that performs color calibration using the calculated color parameter value; and
a determiner that determines, on the basis of a degree of relationship between the estimated color temperature and a current time, whether or not the calculated color parameter value is to be used for the color calibration.

3. A color calibrating method used in a camera device including an imager, the method comprising:
estimating a color temperature on the basis of a video signal obtained from the imager;
calculating a color parameter value corresponding to the estimated color temperature on the basis of a first color parameter value and a second color parameter value, which are color parameter values at a first reference color temperature and a second reference color temperature;
performing color calibration using the calculated color parameter value;
detecting a moving object in an image captured by the imager; and
suppressing, when the moving object is detected, changing of a color parameter value used for the color calibration from a color parameter value corresponding to a standard color temperature to the calculated color parameter value.

4. A color calibrating method used in a camera device including an imager, the method comprising:
estimating a color temperature on the basis of a video signal obtained from the imager;
calculating a color parameter value corresponding to the estimated color temperature on the basis of a first color parameter value and a second color parameter value, which are color parameter values at a first reference color temperature and a second reference color temperature;
performing color calibration using the calculated color parameter value; and
determining, on the basis of a degree of relationship between the estimated color temperature and a current time, whether or not the calculated color parameter value is to be used for the color calibration.

* * * * *